United States Patent [19]

Fair

[11] 4,401,809
[45] Aug. 30, 1983

[54] NITROCELLULOSE PURIFICATION

[76] Inventor: David F. Fair, 102 Mountainview Dr., Hackettstown, N.J. 07840

[21] Appl. No.: 365,124

[22] Filed: Apr. 5, 1982

[51] Int. Cl.³ ............................................. C08B 5/04
[52] U.S. Cl. ..................................... 536/42; 536/38; 149/94; 149/96; 149/100
[58] Field of Search .............. 536/35, 38, 42; 149/94, 149/96,100; 422/193, 195

[56] References Cited

U.S. PATENT DOCUMENTS

| | | | |
|---|---|---|---|
| 1,380,392 | 6/1921 | Kitsee | 536/35 |
| 1,562,093 | 11/1925 | Juer | 536/35 |
| 1,818,733 | 8/1931 | Milliken | 536/42 |
| 2,310,862 | 2/1943 | Nessler | 536/38 |
| 2,341,221 | 2/1944 | Kingery | 536/38 |
| 2,367,533 | 1/1945 | Sillick | 536/38 |
| 2,950,278 | 8/1960 | Plunkett | 536/35 |
| 3,368,875 | 2/1968 | Tulleners | 422/195 |
| 4,206,302 | 6/1980 | Pollozec et al. | 536/35 |

FOREIGN PATENT DOCUMENTS

| | | | |
|---|---|---|---|
| 6947 | 3/1902 | Austria | 536/42 |
| 1037936 | 8/1958 | Fed. Rep. of Germany | 536/35 |

Primary Examiner—Ronald W. Griffin
Attorney, Agent, or Firm—Robert P. Gibson; Anthony T. Lane; A. Victor Erkkila

[57] ABSTRACT

There is disclosed a multi-vessel autoclave which is suitable for use in a continuous process for purifying nitrocellulose made by the nitric acid-sulfuric acid nitration of cellulose. The autoclave comprises a plurality of adjacent cylindrical vessels wherein each common wall between the adjacent vessels has an opening for the passage of the nitrocellulose which is in a slurry. The openings are situated so the slurry flows in a serpentine path.

5 Claims, 1 Drawing Figure

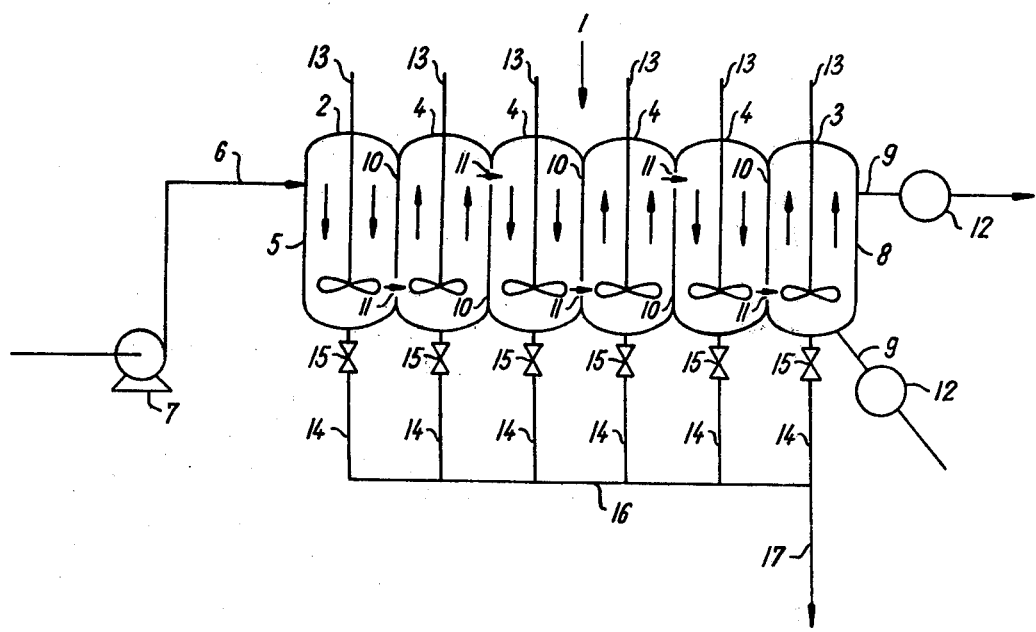

NITROCELLULOSE PURIFICATION

GOVERNMENT RIGHTS

The invention described herein may be manufactured, used and licensed by the Government for Governmental purposes without the payment to us of any royalties thereon.

BACKGROUND OF THE INVENTION

Nitrocellulose, which is processed into various types of propellants, is manufactured from cellulose feed stocks comprising fine fibers of cotton linters or macerated wood pulp.

The present methods used to manufacture nitrocellulose involve the nitration of cellulose with nitric acid, sulfuric acid and water. This process requires a purification operation. The method of purification of cellulose by the military has been relatively unchanged since World War I. The process includes neutralization and stabilization steps which involve an acid boiling operation (stabilization), requiring 25-50 hours, a cutting operation, a poaching operation requiring eight hours, a washing operation and a screening operation. The acid boiling and poaching purification operation consumes large quantities of water, steam and electricty. Although the resulting product is satisfactory, the purification is long and costly. The acid boiling and poaching operations in addition require a large amount of floor space. Several European countries use batch autoclaves to reduce purification time. This approach requires heating up and cooling down cycles, thus consuming considerable amounts of energy. Continuous digesters (tube cookers) have been employed for purifying nitrocellulose but have the following disadvantages:

(a) Inadequate agitation;
(b) No means of venting gases produced in the purification;
(c) Requires cuttiing prior to stabilization; and
(d) Depends on long runs of tube cooker piping.

Lack of proper agitation causes line blockage, a hazardous condition. Maintenance of turbulent flow through tube cookers at temperatures from room temperature to operating temperatures can be a problem because the viscosity of the material being purified varies with temperature.

Retention of gaseous carbon dioxide, nitric oxide and nitrous oxide in the purification medium, is believed to have an adverse effect on the suitability of the nitrocellulose for military uses. Presently used processes for purifying nitrocellulose to meet military specifications remove the unwanted gases by either boiling or venting.

Cutting nitrocellulose prior to the acid boiling step (stabilization) to reduce the probability of line blockage extends purification time. Laboratory studies have shown that the stability of the nitrocellulose is reduced if the nitrocellulose is beaten (cut) before the acid boil operation.

There are several ways in which the proper retention or cooking time can be achieved, for example, in some tube cooker designs, long runs of piping are used. These long runs are susceptible to line blockage which, at the elevated operating temperatures of tube cookers, can be hazardous. High pressure flushing of such blocked tubes is suspect since this might result in the blockage being pushed further down the tube with a probability of cook-off.

The above demonstrates that there is a need for an apparatus and process which will permit continuous stabilization and purification of nitrocellulose to meet military specifications economically, without the above described problems and disadvantages.

BRIEF DESCRIPTION OF THE INVENTION

This invention relates to a continuous process for stabilizing and purifying nitrocellulose. More particularly, this invention relates to the continuous stabilization and purification of nitrocellulose in a continuous multi-vessel autoclave which provides agitation in each vessel, avoids line blockage because stabilization is conducted in large diameter vessels provided with agitators, avoids the need for cutting prior to stabilization since the blockage problem is avoided and other problems associated with long runs of pipe are not present, since no long pipe runs are used.

The continuous multi-vessel autoclave can be used in a one or two step purification process. Specifically, there can be separate acid boiling and poaching units, or the acid boiling and poaching processes can be combined into a one step purification process either following or preceding cutting.

Further, in the process, beating of the nitrocellulose fibers to free sulfate esters therefrom so the sulfate esters can be hydrolized, can be accomplished by using a dissolver in lieu of or, in conjunction with an agitator. Cutting fibers can also be accomplished in the above manner.

Each vessel of the multi-vessel autoclave of this invention has a dump valve, allowing rapid dumping of the contents thereof at several locations at the same time.

Advantageously, the continuous multi-vessel autoclave of this invention requires very little floor space, e.g. each individual acid boiling and poaching unit with a two million pound per month capacity requires about $10 \times 30$ feet.

BRIEF DESCRIPTION OF THE DRAWING

The drawing is a schematic side elevational section view of a continuous multi-vessel autoclave of this invention.

DETAILED DESCRIPTION OF THE INVENTION

The present invention is based on the discovery that continuous stabilization and purification of nitrocellulose produced by the conventional nitric acid-sulfuric acid nitration of cellulose can be economically accomplished by using as the stabilization and purification apparatus, a multi-vessel autoclave. The process can be accomplished in either one or two units of the autoclave. The autoclave vessels are generally cylindrical and are adjacent so each vessel has a common wall with all adjacent vessels. The common walls of the vessels are structured so the nitrocellulose to be purified can, in slurry form, flow therebetween, preferably by a weir arrangement, so the flow is serpentine. Each vessel has an agitator, preferably driven by an electric motor, such as a propeller agitator or a disk mixer, a dump line and a fail safe open valve, a means for heating or injecting steam, and a means for venting carbon dioxide, nitric oxide and nitrous oxide gases. Disk mixers are well known in the art and are commercially available. They are particularly effective agitators/dispersers for assisting in the removal of the residual sulfuric acid from the fibers, thereby accelerating the purification time. In addition, the inlet or first vessel in the autoclave has a slurry inlet line with a metering pump and the outlet or last vessel has a discharge line with a star valve or a double valve. The discharge line can be connected to a second unit as explained hereinafter. The number of vessels in each autoclave unit depends on the desired capacity. Generally, six vessels are sufficient, although the invention contemplates any suitable number of vessels.

Ordinarily, no more than two autoclave units are needed, one for the acid boiling process and connected in series therewith, one for the poaching process. However, if desired, a single autoclave unit can be used to combine the acid boiling and poaching processes.

The autoclaves are made of any suitable materials which can withstand the purification temperatures and pressures and are chemically inert to the chemical conditions of the purification process. Preferably, the vessels are made of stainless steel, the inlet and discharge and flush lines are made of an impact resistant chemically inert thermosetting plastic and the agitators are made of stainless steel. A conventional heat exchanger or heat pipes can be used to recover heat from the processed slurry and use it to preheat the incoming slurry.

Referring now to the drawing, the multi-vessel autoclave 1 of this invention is comprised of a series of cylindrical vessels, i.e. the inlet vessel 2, the discharge vessel 3, and the interior vessels 4, wherein the height of each vessel is the same as the others in the autoclave 1 and is at least twice the diameter thereof. The outside wall 5 of the inlet vessel 2 has an inlet line 6 in the upper portion thereof. The nitrocellulose to be purified is pumped in slurry form through the inlet line 6 by a metering pump 7. The outside wall 8 of the discharge vessel 3 has a discharge line 9 extending therefrom. The discharge line 9 is either in the upper or lower portion of the wall 8 (both alternatives are shown in the drawing) and flow therethrough is controlled by a discharge valve 12 in the line 9. The discharge valve 12 can be a star or double valve. Each of the interior vessels 4 has two common walls 10 with the adjacent interior vessel 4. The inlet vessel 2 and the discharge vessel 3 each have one common wall 10 with an adjacent interior vessel 4. Each of the common walls 10 in the adjacent vessels 2, 3 and 4 has an opening 11 to provide a means for the nitrocellulose slurry being purified to flow through the autoclave 1 in the direction of the arrows in the drawing. The wall openings 11 are alternately on the upper portion and the lower portion thereof to provide a serpentine flow to the slurry from the inlet line 6 to the inlet vessel 2, then through the opening 11 in the wall 10 common to the inlet vessel 2 and the adjacent interior vessel 4, then through the opening 11 in the successive interior common walls 10 until the discharge vessel 3 is reached, then the slurry flows out the discharge line 9 through a discharge valve 12 thereon. The flow rate of the slurry is controlled by the metering pump 7 in the inlet line 6. In addition, the weirs at openings 11 can be adjusted to act in concert with the metering pump 7.

The multi-vessel autoclave 1 operates under pressures between one and seventeen atmospheres. In a preferred embodiment, steam can be injected into the slurry through the vessels in order to maintain the slurry at temperatures between 100° C. and 200° C. Steam lines with check valves can be incorporated into the vessels 2, 3 and 4 for this purpose. The steam lines are not shown since they are conventional and not part of the inventive apparatus. The check valves on the steam lines prevent back flow of the nitrocellulose slurry. In order to maintain heat in the vessels, additional steam can be injected and/or the vessels can be insulated. An alternative to steam injection is the use of heating jackets.

Each vessel 2, 3 and 4 of the autoclave 1 has entering it through the top, an agitator 13 for beating the slurry as it travels through the autoclave 1. In a separate poaching autoclave, the agitators 13 may be replaced by recirculating pumps (not shown). This is an alternative arrangement.

In a more preferred embodiment, lines for metering pH control additives or stabilization accelerating additives can be placed onto the vessels 2, 3 and 4 in the autoclave 1.

Conventional vents, not shown, are provided on the vessels 2, 3 and 4 for venting gases or controlling pressure.

Each vessel 2, 3 and 4 in the autoclave 1 is provided with a dump line 14, having a fail safe open dump valve 15. The dump lines 14 are connected by a horizontal dump line 16 which discharges all the material out through one discharge line 17. Flushing lines, not shown, are provided on vessels 2, 3 and 4 for flushing the vessels with high pressure water. A means can be provided vessels 2, 3 and 4 to take samples of the slurry being processed by means of a star or double valve arrangement.

The operation of the apparatus and process of this invention is as follows:

Nitrocellulose slurry is pumped through inlet line 6 by the metering pump 7 into the inlet vessel 2 where it is heated by either steam injection or a heating jacket to about 100° C. to 200° C. The agitator 13 is in the meantime caused to rotate by an electric motor (not shown). The pressure within the autoclave is from about 1 to about 17 atmospheres. The slurry is caused to flow through vessel 4 to vessel 3 by the pressure from the metering pump 7. Each vessel has an agitator 13 which operates while the slurry is pumped through. The slurry is caused to flow through the walls 10 at openings 11 in a serpentine path and is continually discharged through discharge line 9. The discharge rate is controlled by the discharge valve 12. Gases formed during the operation are vented to maintain the pressure.

This invention has been described with respect to certain preferred embodiments and modifications. Variations in the light thereof will be suggested to persons skilled in the art and are to be included within the spirit and purview of this application and the scope of the appended claims.

I claim:

1. A continuous process of purifying nitrocellulose by stabilizing and poaching a slurry of nitrocellulose produced by the nitric acid-sulfuric acid nitration of cellulose comprising continually pumping the slurry through an inlet line into the first of a series of adjacent pressure vessels making up an autoclave, each of said vessels having a common wall with vessels adjacent to it and an agitator therein; heating said slurry in said vessels to about 100° C. to 200° C. while agitating under a pressure of about 1 to 17 atmospheres; causing the slurry to flow through passageways in said common walls arranged to provide serpentine flow through the series of said vessels under said pressure while agitating; and continually discharging the treated slurry through a discharge line in the last of the series of said vessels.

2. A continuous process of purifying nitrocellulose comprising stabilizing and poaching a slurry of nitrocellulose produced by the nitric acid-sulfuric acid nitration of cellulose by the process of claim 1 wherein the treated slurry is discharged through the discharge line of said last of the series of said vessels into a line connected to the inlet line of a similar series of vessels in a second autoclave and treating the slurry as in the first autoclave, then continuously recovering the treated slurry from a discharge line in the last of the vessels in the second autoclave.

3. In a continuous process of purifying nitrocellulose by stabilizing and poaching a slurry of nitrocellulose produced by the nitric acid-sulfuric acid nitration of cellulose, the improvement which comprises continuously introducing the slurry into the first of a series of adjacent pressure vessels forming an autoclave, each of said vessels having a common wall with vessels adjacent thereto; continuously flowing the slurry through openings in said common walls arranged to provide flow alternately upward through one vessel and downward through an adjacent vessel through the series of said vessels at elevated temperature and pressure; continuously agitating said slurry in each of said vessels to accelerate the purification; and continuously discharging the treated slurry from the last of said vessels.

4. The process according to claim 3, wherein the gases evolved during the process are vented from each of said vessels.

5. The process according to claim 3, wherein the agitation is provided by disk mixers.

* * * * *